Oct. 11, 1932.　　　W. W. MOHR　　　1,882,227
GATE VALVE
Filed Dec. 5, 1930
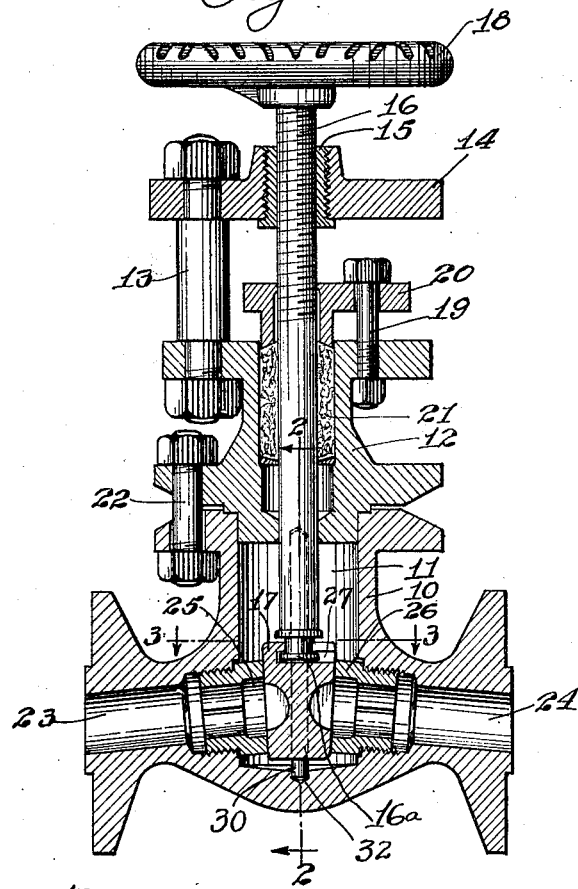
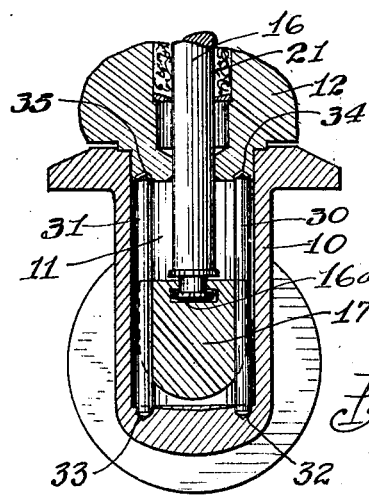
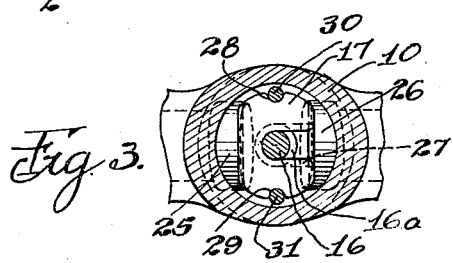
INVENTOR.
WALTER W. MOHR.
BY Albert C. Bell
ATTORNEY.

Patented Oct. 11, 1932

1,882,227

UNITED STATES PATENT OFFICE

WALTER W. MOHR, OF CHICAGO, ILLINOIS, ASSIGNOR TO THE EDWARD VALVE AND MANUFACTURING COMPANY, OF EAST CHICAGO, INDIANA, A CORPORATION OF ILLINOIS

GATE VALVE

Application filed December 5, 1930. Serial No. 500,205.

My invention relates to an improved construction of forged steel valves of the gate valve type, for use with fluids under high pressure and temperature.

Forged steel valves are required to control the flow of fluid under high pressure and temperature, and experience has shown that the only practical constructions that will meet these working requirements, are valves in which the bodies are forged from steel by means of suitable dies, the resulting body blanks being solid, and the necessary compartment for the valve mechanism per se, and the passages for fluid flow, being subsequently made in the solid blanks by drilling operations in connection with finishing the body blanks for use.

As a result of the limitations imposed by boring the compartment for the valve per se, in a solid forged steel blank, devices commonly used heretofore in gate valve constructions, for holding the valve member of the gate valve in alignment with the valve seats, cannot be successfully or effectively employed. In connection with gate valves having bodies of cast metal, two different constructions have heretofore been employed to maintain the valve member of the gate valve in alignment with the valve seats as follows: first, grooves have been formed in the cast metal body at the time of making the casting, to receive lugs extending from the valve member, and second, grooves have been formed in the valve member to be engaged by ribs or lugs extending inwardly from the inner wall of the cast metal body. In making forged steel valve bodies in the manner described, it is not practicable to form lugs or ribs extending into the compartment for the valve member, on account of the compartment being formed by a boring operation or operations, and where grooves in the inner surface of the valve body are relied upon to cooperate with lugs on the valve member, the grooves tend to fill with foreign matter, particularly where the valves are used in oil refining operations to control the flow of hot oil from one location to another, in which service, tar and coke deposits occur.

By my present invention the difficulties referred to are avoided, by providing a guiding construction consisting of grooving the valve member and providing guideways for the valve member in the compartment in the valve body, which are separate from the valve body and held in place at their ends by the valve body at one end and by the valve bonnet at the other end, thus providing effective guide members or rods for engaging the grooves in the valve member, without interfering with the boring operation or operations required in making the valve compartment in the forged steel valve body, and without in any way complicating the making of said compartment.

My invention will best be understood by reference to the accompanying drawing showing a preferred embodiment thereof in which Fig. 1 illustrate my improved construction in vertical, central, sectional view through the fluid passages formed in the valve body, Fig. 2 is a sectional view of a part of the construction shown in Fig. 1 taken along the line 2—2, and Fig. 3 is a sectional view of a part of the construction shown in Fig. 1 taken along the line 3—3.

Similar numerals refer to similar parts throughout the several views.

As shown in Fig. 1, my valve construction consists of a forged steel body 10 provided with a valve compartment 11, formed by a boring operation or operations, the upper end of the compartment 11 being closed by a bonnet 12, the upper end of the bonnet having secured thereto a plurality of pillars 13, but one of which is shown, supporting a yoke 14 provided with a threaded yoke bushing 15, which bushing is internally threaded to engage corresponding threads on the valve stem 16 extending through the bonnet 12 to engage and operate the valve member 17 of the gate valve. A hand wheel 18 is secured to the outer end of the valve stem 16 as indicated. The bonnet 12 also has secured to its upper end by bolts 19, but one of which is indicated, a gland member 20 for holding the packing material in the stuffing box 21 formed in the bonnet 12 around the valve stem 16. The body 10 and bonnet 12 are provided with flanges held together by bolts 22, of which but one is shown.

The valve body 10 is provided with fluid passages 23 and 24, formed in the body by drilling operations, which passages incline upwardly slightly and open at their inner ends into the valve compartment 11. Suitable connection flanges are preferably provided on the valve body, around the outer ends of said passages. The inner ends of the passages 23 and 24 are counterbored and threaded to receive the threads of the tubular valve seats 25 and 26 respectively, the inner ends of which form the seating surfaces for engagement with opposite faces of the valve member 17, which opposite faces are inclined towards each other at their lower ends from parallelism, by amounts corresponding to the upward inclination of the axes of the passages 23 and 24, to facilitate tightly seating the valve member between and against the valve seats and to more quickly open the valve than if the opposite faces of the valve member were parallel. The inner end surfaces of the valve seats 25 and 26 are perpendicular to their axes respectively.

As more clearly shown in Fig. 3, the upper end of the valve member 17 is provided with an undercut groove 27 opening through one side of the valve member, to receive the head 16a formed on the lower end of the valve stem 16, so that the valve member may be placed on the lower end of the valve stem by relatively lateral movement, after which, as long as the valve member and valve stem are maintained substantially in alignment with each other, separation of the valve member and valve stem is prevented. As shown in Fig. 3, the opposite edge portions of the valve member 17, between the seat engaging faces thereof, are provided with grooves 28 and 29 substantially parallel with the axis of the valve member 17 and valve stem 16, in which grooves, iron or steel rods 30 and 31 respectively are held in sliding engagement and separate from the body, by disposing the ends of said rods 30 and 31 in shallow holes therefor as more clearly shown in Fig. 2, the lower ends of said rods tightly fitting respectively in holes 32 and 33 in the lower end wall of the bore forming the valve compartment 11, while the upper ends of said rods are contained in corresponding holes 34 and 35 formed in the lower end of the bonnet 12, which extends into and closes the upper end of the compartment 11 when the bonnet is secured in place on the valve body. The rods 30 and 31 are preferably pointed at their upper ends as indicated to facilitate their entry into the holes 34 and 35 in assembling the parts.

As a result of the construction described, the bore forming the valve compartment 11 may be made in just the same manner that it would be made if there were no problem of guiding the valve member 17; the grooves 28 and 29 in the valve member 17, open freely at their lower ends and this in conjunction with the sliding of the valve member on the rods 30 and 31, prevents the deposit of foreign matter in the grooves; and the construction and relation of the guide rods 30 and 31 is such that there is no tendency for foreign matter to deposit on the rods in a manner to interfere with movement of the valve member on the guide rods. In this manner, the valve member is afforded a positive guide, the valve member is maintained in alignment with the valve stem due to the groove 27 extending transversely of the plane of the axes of the rods 30 and 31, and the valve member is maintained in alignment with the faces of the valve seats 25 and 26 engaged by it, to the end that the valve member is at all times in position to be accurately seated against the faces of the valve seats when the valve is closed.

While I have shown my invention in the particular embodiment above described, it will be understood that I do not limit myself to this exact construction as I may employ equivalents known to the art at the time of the filing of this application without departing from the scope of the appended claims.

What I claim is:

1. Guiding means for gate valve members of steel valves for high pressures having forged steel bodies and bonnets for closing them, said bodies carrying opposed valve seats, and gate valve members movable to engage and clear said seats, said guiding means for valves of the kind described comprising the combination with a body and bonnet of such a valve of guide rods substantially parallel with the path of travel of the valve member of the valve, the valve member of the valve having edge grooves for receiving said rods, said body having a shallow hole in its inner surface for one end of each of said rods, and said bonnet having in its inner surface a shallow hole for the other end of each of said rods, said shallow holes extending but part way through said body and said bonnet, whereby said body and said bonnet are imperforate and integral around the ends of said rods.

2. Guiding means for gate valve members of steel valves for high pressures having forged steel bodies and bonnets for closing them, said bodies carrying opposed valve seats, and gate valve members movable to engage and clear said seats, said guiding means for valves of the kind described comprising the combination with a body and bonnet of such a valve of guide rods substantially parallel with the path of travel of the valve member of the valve, the valve member of the valve having edge grooves for receiving said rods, said body having a shallow hole in its inner surface for one end of each of said rods, and said bonnet having in its inner surface a shallow hole for the other end of each of said rods, said shallow holes extending but part way through said body and said bonnet, whereby said body and said bonnet are imperforate and integral around the ends of said rods, said shallow holes in said body tightly fitting said rods to hold them in alignment during assembly of the valve.

In witness whereof, I hereunto subscribe my name this 1st day of December, A. D. 1930.

WALTER W. MOHR.